Dec. 23, 1952      J. J. KANTER      2,622,465
APPARATUS FOR STRESSING BOLTS AND STUDS
Filed Sept. 1, 1949      2 SHEETS—SHEET 1
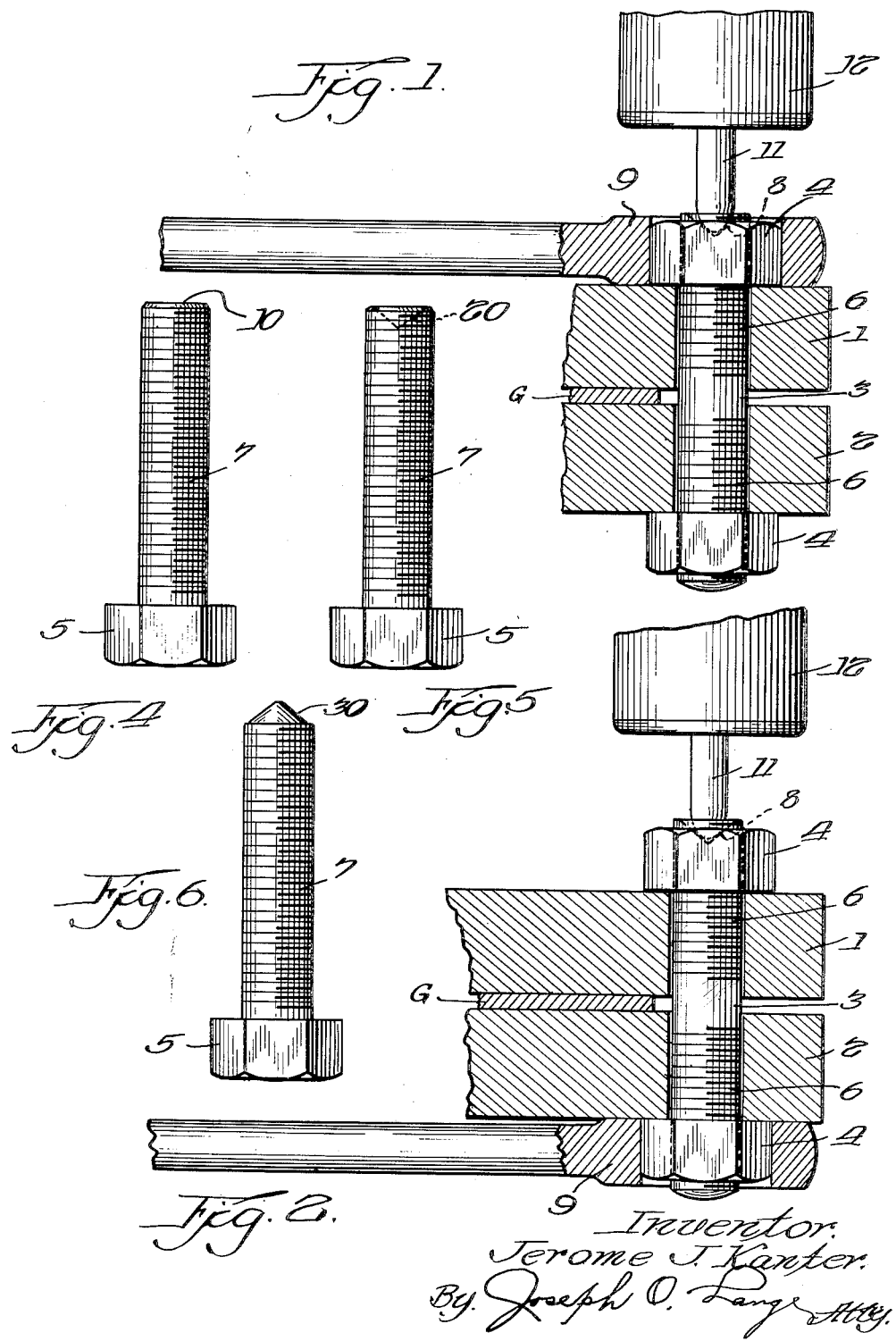
Inventor:
Jerome J. Kanter.
By Joseph O. Lange Atty.

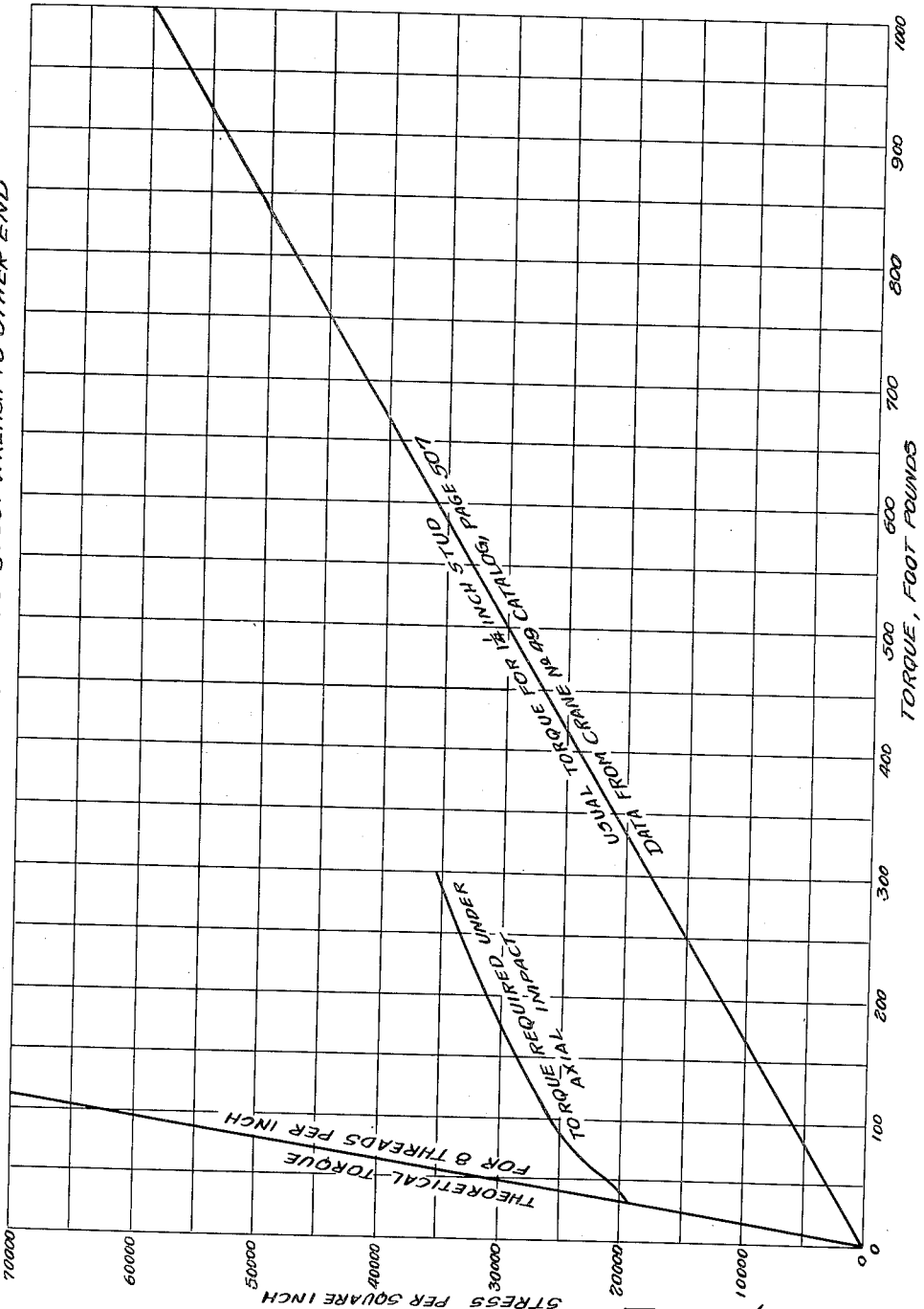

Patented Dec. 23, 1952

2,622,465

UNITED STATES PATENT OFFICE 2,622,465

APPARATUS FOR STRESSING BOLTS AND STUDS

Jerome J. Kanter, Palos Park, Ill., assignor to Crane Co., Chicago, Ill., a corporation of Illinois Application September 1, 1949, Serial No. 113,634

1 Claim. (Cl. 81—52.3)

This invention relates to apparatus for stressing bolts and studs.

More particularly, this invention is concerned with a means for imparting greater stress to the bolts and studs conveniently and with less effort by the operator than heretofore deemed possible.

In order to obtain a greater appreciation and better understanding of this invention, it should be understood at the outset that vibration is responsible for the loosening of nuts upon bolts or studs and to overcome this objectionable condition, many devices ranging from cotter-pins to locknuts have been employed.

However, it does not seem to have been recognized prior to this invention that vibration as such may also be used in the control of stress application to bolts and studs. More importantly, it is an object of this invention to provide means whereby when a series of impacts is applied in the axial direction of a bolt or stud and simultaneously therewith, a torque is applied to the nut in the tightening direction, a higher degree of stressing or loading of the bolt or stud is accomplished than would be the case if the same degree or intensity of torque were applied in the ordinary manner. This is true because the axial stress waves serve to momentarily and successively reduce the friction of the contact in the screw thread, thereby allowing the applied torque to increase stress beyond normal restraints of friction.

It is conceivable that axial vibration properly applied to the bolts or studs may lead to a stress for a given torque, approaching that which would obtain the mechanical advantage of a frictionless screw. At certain critical frequencies of axial impact application to the bolt, the stress waves would be reinforced by the reflected waves and the effective friction between the bolt and the nut might be very effectively reduced, with exertion of only moderate impact.

Repeated tests have confirmed that impacts from an air hammer or the like applied to the ends of studs or bolts placed through blocks in such a manner that the resulting stress from a given torque application may be compared with that obtained through ordinary torque application.

This invention has particular application wherein the vibration method is effective in increasing the stress given torque. The utility of the invention is also particularly significant in such applications wherein such seizure susceptible bolting and nut materials as, for example, steel alloys composed of 18% chromium and 8% nickel may easily be used. It is ordinarily barred because high torque loadings are prohibited by the galling or tearing of the metal under ordinary circumstances.

Another advantage of my invention lies in the fact that shorter wrenches may be used in closer quarters than heretofore, and such shorter and lighter wrenches will permit redesign of connecting flanges, as, for example, of the type shown on page 288, Crane Co.'s No. 49 catalog. It will also be clear that while my invention is described herein as being applicable to stressing bolts and studs, it also has application to the unstressing or relieving the tension load on bolts by merely reversing the direction of rotation of the torque applied to the nut to loosen the latter member rather than to tighten it.

Another advantage of my invention lies in its provision for the application of a series of axial impacts to a bolt or stud for the purpose of intermittently reducing the friction while torque is applied to the nut to permit the latter member to turn without injury to the threads.

A further object lies in the provision of a method or process in which it is optional as to which end the impacts are applied, and the process may be applied to studded-in bolts, as well as through-bolts or capped bolts with integral head. Thus, where the term "bolts" is used in the specification and claim, all of these equivalents are implied as well.

Other important objects and advantages of the the invention will become more readily apparent in connection with the reading of the specification in light of the accompanying drawings, in which Fig. 1 is a fragmentary sectional view of one preferred form of my invention.

Fig. 2 is a modification of the form of the invention.

Fig. 3 is a performance graph showing a comparison between standard methods of effort applied and that embodying my invention.

Figs. 4, 5, and 6 show exterior views of bolts preferably formed for embodying my invention.

Similar reference characters refer to similar parts throughout the several views.

Referring now to Fig. 1, the fragmentary section of a pair of flanges, designated 1 and 2, such as those above referred to, are shown bolted together by means of the usual bolt or stud 3, as shown, the stud having a nut 4 at its upper and lower ends, although the latter may be integral with the stud as desired to form a folt as shown in Figs. 4 to 6, inclusive. The stud 3 is preferably threaded at 6 and 7 which may be for a portion of its length or full length as desired without affecting the application of my invention. However, the nut 4 at the upper end is threadedly applied to ride on the threads 6 in the conventional manner to draw the flanges 1 and 2 together. It has been found desirable to provide the stud 3 with a prepared or formed end to receive the impacts as hereinafter referred to in more detail. This preparation of the stud may take place adjacent to the nut 4, as illustrated, with the end portion preferably recessed, as indicated at 8, or it may be applied to the opposite end, or it may even be applied to the head whether the latter is integral or a separate nut as shown. A wrench 9 is shown applied to the nut 4. Above the recess 8, and having contact therewith, is the impactor 11 of the hammer 12, which may be fluid operated, electrically operated, manually operated, or otherwise operated.

The discovery has been made that if repeated impacts of a hammer are applied as indicated in the figure to the end of the stud or a bolt at the hollow portion 8, or to such portion as otherwise formed, and hereinafter referred to, by means of the impactor 11, and simultaneously torque is applied to the wrench 9 in the direction to tighten the nut 4, the vibration force will substantially reduce the amount of torque required and result in considerably less effort being exercised by the individual handling the wrench.

This is shown by reference to Fig. 3. The latter figure depicts the results of an experiment illustrative of the effectiveness of the application of axial impacts in reducing friction in the loading of bolts. The normal static torque required to stress lubricated bolting against friction from carefully determined data to be found in the Crane Co. No. 49 catalog, page 507, is shown for the case of 1¼ inch alloy steel stud. Contrasted to this data is the theoretical torque for the same screw in the complete absence of friction as computed from the formula, $$\text{Stress} = \frac{2\pi \times \text{lever} \times \text{pitch} \times \text{force applied in torque}}{\text{cross-sectional area of screw}}$$

It is apparent from these two curves that in the normal tightening of this bolt, about 89 percent of the torque work is dissipated in friction. A third curve is shown giving the tightening torque determined against resulting stress as required when the thrusts from a 7 inch stroke air hammer, at 90 pounds air pressure, are applied axially to the bolt. A stress of 17,000 pounds per square inch was attained under the torque computed for frictionless tightening or at about 25 foot-pounds. Normally, this degree of tightening would require about 280 foot-pounds, as shown by the recognized data. Thus, a margin of torque of about 255 foot-pounds has been eliminated, and approximately this margin is seen to be saved in further tightening to greater stresses. The tests have confirmed that whether the impacts are applied to the end of the bolt opposite to that at which the wrench is applied, or to the same end at which the wrench is applied, it makes little difference in the release of friction for given intensity of impacts. If greater frictional release is desired, it is merely necessary to substitute a hammer with a greater stroke.

It has also been demonstrated by tests that transverse impacts from the hammer to the bolt are ineffective in producing a release of friction during tightening, and that essentially the normal static torque is required for this condition. Thus, while axial impacts can eliminate the friction if applied during the turning of the unit, it is clear that rotary impacts do not accomplish the elimination of friction.

It should, of course, be appreciated that in the type of devices to which these bolts and studs are applied, it is very important to maintain a very high bolt stress, otherwise the high pressure used would escape past the gasket G and cause objectionable leakage, in addition to the possible deformation of the flanges themselves. It has been found that it is not absolutely necessary to apply the hammer to the end of the stud or bolt at which the wrench is positioned, and in the modification shown in Fig. 2, the wrench is shown applied to a similar assembly to that shown in Fig. 1, but the wrench 9 is applied at the far end with respect to the air hammer 12. However, the principle employed is identical to that described in connection with Fig. 1.

In Figs. 4 to 6, inclusive, the bolts, which could also be studs, with the heads 5 and threaded as at 7 are illustrated with specially prepared or formed ends 10, 20, and 30 to receive impactor tools, as, for example, of the type illustrated in U. S. Patent Number 2,012,916, issued August 27, 1935.

It will be noted by reference to Figs. 1 and 2 that the wrench 9 may be positioned at either end of the stud 3 (or the bolt 5) with equally good results. It has also been discovered that the wrench 9, if desired, may be applied simultaneously to both ends of the bolt or stud to the nut 4 or the head 5, and the results are also satisfactory in that the number of impacts applied by the hammer is less to accomplish desired compression and decompression. Thus, the method and apparatus of this invention will be observed as possessing unusual flexibility in application insofar as end results are concerned.

It will, of course, be appreciated that merely for purposes of illustration only two applications of the principle embodying my invention have been shown, but a number of ways may be used without departing from the spirit of the invention as defined by the appended claim.

I claim:

In apparatus for applying a high stress to bolts or studs, the apparatus providing for a series of impacts to be applied in the axial direction of a bolt or stud while torque is applied to a nut therefor in a tightening direction, the apparatus comprising impactor means for applying impacts to an end of the bolt or stud, which end is suitably formed to receive impacts from the said impactor means without substantial deformation to the threads of the bolt or stud, a wrench member therefor applied to the nut normally abutting against a member or members to be drawn together while engaging the nut, the torque being applied to the wrench while applying simultaneously repeated impacts by the impactor means.

JEROME J. KANTER.

REFERENCES CITED

The following references are of record in the file of this patent:

UNITED STATES PATENTS

| Number | Name | Date |
|---|---|---|
| 387,115 | Sherman | July 31, 1888 |
| 1,952,395 | Tillyer et al. | Mar. 27, 1934 |
| 2,086,667 | Fletcher | July 13, 1937 |
| 2,484,471 | Shinn | Oct. 11, 1949 |
| 2,559,558 | Carlson et al. | July 3, 1951 |